United States Patent [19]

Unruh

[11] Patent Number: 5,619,800
[45] Date of Patent: Apr. 15, 1997

[54] PARALLEVEL ALIGNMENT SYSTEM

[76] Inventor: Willie C. Unruh, 8107 Peachtree, Wichita, Kans. 67207

[21] Appl. No.: 423,366

[22] Filed: Apr. 18, 1995

[51] Int. Cl.⁶ .................................................. G01B 5/255
[52] U.S. Cl. ........................... 33/203.15; 33/203.13; 33/381; 33/600
[58] Field of Search ........................... 33/203, 203.15, 33/203.16, 203.17, 203.18, 286, 288, 335, 336, 381, 533, 600

[56] References Cited

U.S. PATENT DOCUMENTS

| | | | |
|---|---|---|---|
| 1,544,980 | 7/1925 | Hartsock | 33/600 |
| 2,020,614 | 11/1935 | Miller | 33/203.15 |
| 2,532,749 | 12/1950 | Aurand et al. | 33/600 |
| 2,616,186 | 11/1952 | Shooter et al. | 33/203.17 |
| 3,426,438 | 2/1969 | Wilkerson | 33/203.18 |
| 3,805,399 | 4/1974 | Price | 33/203.18 |
| 5,471,754 | 12/1995 | Mieling | 33/203.18 |

*Primary Examiner*—G. Bradley Bennett
*Attorney, Agent, or Firm*—Bradley P. Sylvester

[57] ABSTRACT

An alignment apparatus, comprising a set of tripods, having rollers on the base of each tripod, where the tripod replaces the wheel on a vehicle axle hub, and the vehicle is lowered so that the tripods support the weight of the vehicle. The tripods have a set of gauges, which display whether a gauge bar, on the base of the tripod, is level lengthwise, and from side to side. An adjustable gauge is used when the tripods are raised off of the ground, or when the steering wheel is used to turn the hubs, and the adjustable gauge is recalibrated to display the readings given by the other gauges when the tripods support the vehicle, or prior to the turning of the steering wheel. The information on the gauges is used to determine and correct camber, castor and toe in and toe out setting of the hubs, in relation to each other.

5 Claims, 2 Drawing Sheets

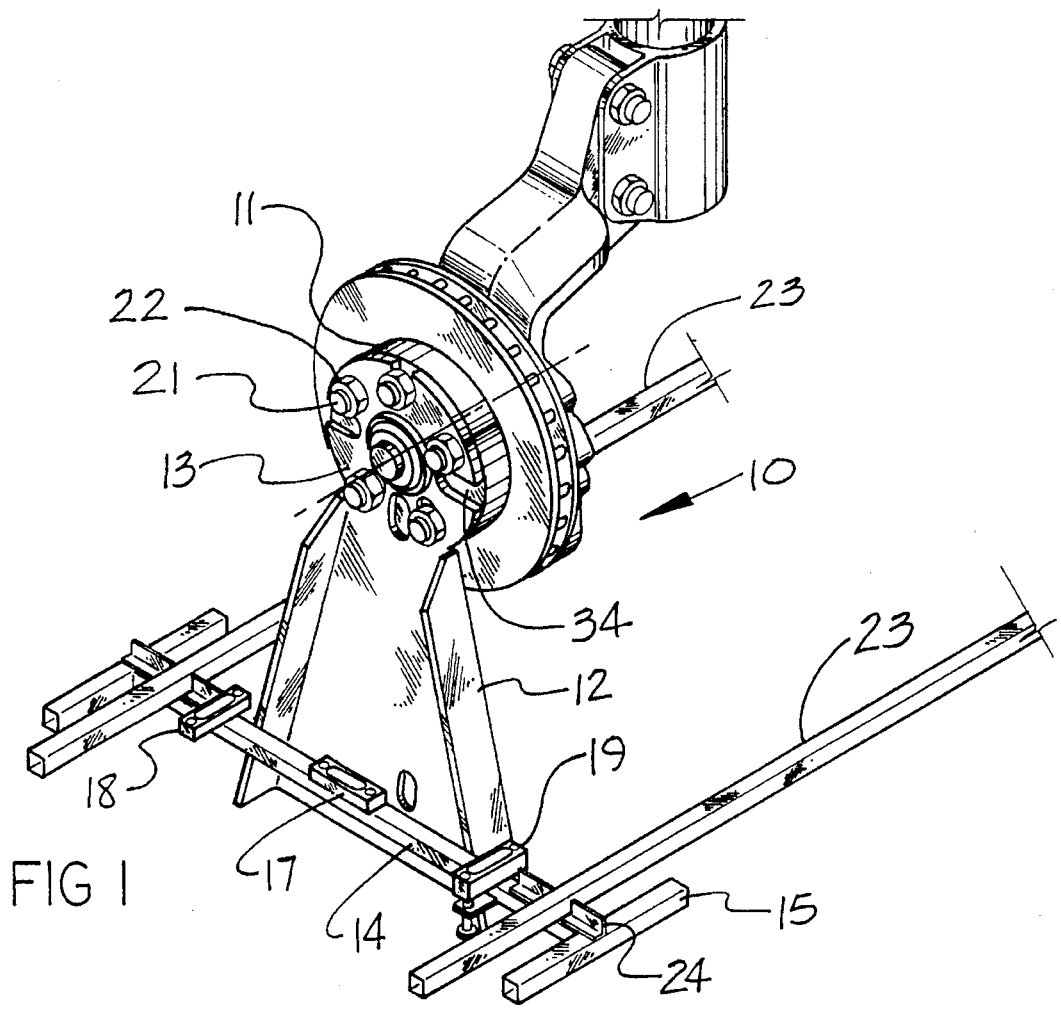
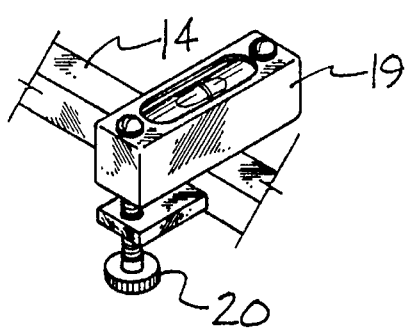
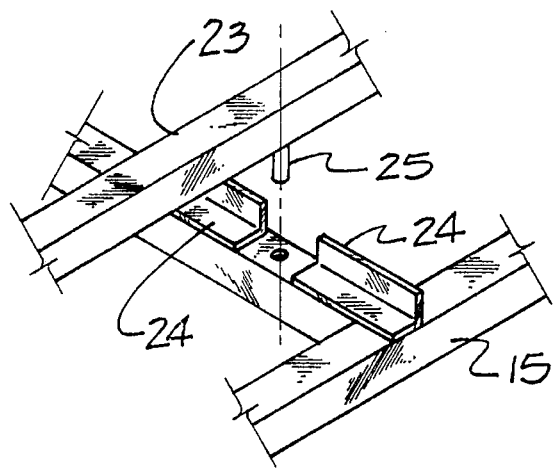

PARALLEVEL ALIGNMENT SYSTEM

BACKGROUND OF THE INVENTION

Proper wheel alignment is necessary for safe vehicle operation. Wheels that are out of alignment, in relation to each other, cause their respective tires to wear unevenly. This gives the vehicle an uncomfortable ride, and increases the chance of an accident due to tire failure or improper steering response.

Vehicle wheels are fixed into proper alignment at the time of manufacture. Subsequent consumer use often involves the wheels contacting uneven road surfaces, or inadvertently striking objects and curbs, which can shift the proper alignment settings.

There are three types of wheel alignment settings, that can cause driving difficulty for the vehicle operator if they shift. The first setting is the "camber", or the side to side angle of the wheel from a vertical line. The second setting is "caster", which is the forward or rearward angle of a line, from a vertical line, as measured between the upper and lower ball joints of the wheel assembly. The third setting is the line of travel that a single wheel wishes to follow as it rotates, or what is commonly referred to as toe in or toe out settings of a wheel, in relation to the other wheel on a given axle. Wheels on a single axle, that do not have the proper toe in or toe out setting, can cause the vehicle to pull or turn from one side to the other, when travel is attempted along a straight line.

Various methods and apparatus have been used to determine and correct these three settings. Wheels on each axle can be compared to each other to determine toe in or toe out, and leveling systems are used to check the camber and caster. The methods previously used have required large and expensive systems, with a great deal of training and expertise needed to operate properly. Current state of the art equipment comprise electronic measuring devices, that determine the alignment of wheels, in which the average mechanic has difficulty operating without extensive training. The cost of this equipment often exceeds the ability of a small shop owner's financial means. In addition to the electronic equipment, a large lift is necessary, since the entire vehicle must be lifted off of the ground during the alignment process.

The camber and castor settings can be adjusted on some vehicles, while others vehicles are not adjustable, due to the manufacturer's design. Vehicle manufacturers have different tolerances for camber and castor, depending on the vehicle. While proper camber settings are generally designated as zero degrees from a vertical line, proper castor settings may vary over several degrees forward or behind a vertical line, depending on the vehicle.

Toe in or toe out depends on the type of vehicle, and intended use. Nearly every vehicle has adjustments available on the wheel assembly, to modify the toe in or toe out settings. Fixed rear wheels may have adjustments made using such methods as the insertion of shims.

SUMMARY OF THE INVENTION

It is the object of this invention to provide a portable apparatus, with a minimum of parts, that can accurately determine the relative camber, caster and toe in or toe out of opposing wheels on a single axle.

It is a further object of this invention to provide an apparatus that can be used on any level surface, requiring only one axle at a time to be elevated during the determination of relative camber, caster, and toe in or toe out of opposing wheels on a single axle.

It is a further object of this invention to provide an apparatus, that can be operated proficiently and accurately with a minimum of training, prior to use.

It is a further object of this invention to provide an apparatus that allows relative caster, camber and toe in or toe out settings to be determined, using a simple bubble gauge readout, that allows adjustments to be made with the apparatus on the vehicle, with the adjustment changes reflected on the bubble gauges.

It is a further object of this invention to provide an affordable apparatus, that allows small garages or individual mechanics, with limited financial means, to obtain the necessary equipment to properly complete vehicle wheel alignments.

It is a further object of this invention to provide an apparatus that can be used on a variety of vehicle makes and models, in which all parts are interchangeable, for use on vehicles of various sizes.

This invention provides an apparatus that allows a single mechanic to accurately determine vehicle wheel alignment settings, using a simple and easy to operate system. The alignment can be completed, using nothing more than the four necessary pieces that make up this apparatus, and a means to elevate one of the vehicle axles, when the vehicle is on a level surface.

The apparatus is comprised of two identical tripods that each have a top circular area defining a plurality of apertures, that are spaced apart to receive wheel studs, bottom base that contacts the ground through a set of rollers. Depending on the size of the vehicle being aligned, a tripod of larger or smaller size may be necessary, due to the stud positions on the wheel hub assembly. Three different sizes of tripods and aperture placement patterns allow almost all makes of cars and small trucks to have their wheels aligned with this apparatus.

A gauge bar is fixed horizontally to the tripod, and supports three gauges. The first gauge is nonadjustable and centrally located along the length of the gauge bar. This first gauge is referred to as the caster gauge, and displays information about whether the gauge bar length is parallel to the ground.

A second gauge is positioned near one of the gauge bar ends. This gauge is referred to as the camber gauge. It is also nonadjustable, and is positioned ninety degrees horizontally, in relation to the caster gauge on the gauge bar. The readings from the camber gauge disclose whether or not the gauge bar and corresponding axle are at an angle, in relation to the ground.

A third adjustable gauge is located on the gauge bar, on the end of said bar opposite the camber gauge, and is referred to as the adjustable gauge. This gauge is manually adjustable, and discloses the change in the tilt of the gauge bar from side to side, in relation to the ground, and can be recalibrated to a zero or level setting using an adjustable screw, which when turned, raises or lowers one end of the adjustable gauge.

A horizontal T-bar is fixed to each of the gauge bar ends with the T-bar being perpendicular to the gauge bar. The gauge bar has a set of flanges fixed to it, in close proximity to the T-bar, which define a notch between them. The notch is used as the holder for toe bar ends. The toe bars have a length that exceeds the distance between the wheels on a given axle, with each end portion positioned within its respective notch on the gauge bars. Toe bars have measurement markings on at least one of their ends, with a means to secure the other end of the toe bar within a particular notch. Preferably, a protruding pin is fixed to the underside of one of the toe bar end. The pin is positioned within a hole, located in the notch of the gauge bar, and holds one end of the toe bar end in position, with respect to one gauge bar and tripod only. The other end of the toe bar has measurement markings on it, and slides freely within the notch defined by the flanges on the gauge bar on the other tripod. A reading of the toe bar measurement markings on the toe bar's other end is easily made, using the flange on the gauge bar, as a specific point of reference, to mark measurements from.

To align a vehicle wheel, using the apparatus, a level surface is selected, and one entire axle is elevated, so that the wheels of that axle are lifted slightly off of the ground. A simple jack is sufficient for this apparatus. The tripods are attached to the wheel hub assembly, by removing the tire and wheel, and sliding the wheel studs through the tripod apertures. The wheel nuts are tightened on the check studs against the tripod, fixing the tripod firmly to the wheel hub assembly.

Once a tripod is fixed to each wheel hub assembly, the vehicle is lowered, so that the rollers on the tripod bases contact the ground, and support the vehicle. The rollers allow the tripod to move back and forth, as the weight of the vehicle bears down on the tripod. When the vehicle has been fully lowered, the tripod reflects the true angle of the wheel hub assembly, in the same manner as if the actual wheel was in place. If a wheel and tire were raised and lowered in the same manner, the camber readings would not be as accurate since a tire, once it contacted the ground surface, would tend to resist further sideways movement as the vehicle continued to lower, increasing the weight placed on the hub.

Once the vehicle is completely lowered, so that the tripods support the axle, a reading is taken from the fixed camber gauge to determine whether or not camber adjustments are necessary. For example, if the camber gauge reading is four degrees, and the settings should be zero degrees, camber adjustments are necessary. To adjust the camber settings, the axle is raised to a working level, which removes the downward force applied to the wheel hub. This will often cause the wheel hub to move to a different camber position, making the first camber gauge unusable while the hub and tripod are raised off of the ground. The adjustable gauge is calibrated to the same setting as was previously read from the first camber gauge. For example, if the first fixed camber gauge originally read negative four degrees, the adjustable gauge is calibrated to read negative four degrees once the tripods are lifted off of the ground. Adjustments are made to the camber settings on the wheel hub assembly, until the adjustable gauge shows the proper camber reading, which would be zero degrees in the exampled case. The same steps are performed on each wheel hub assembly. Front axles may have adjustable settings, with rear axles of some vehicles requiring shims to make the necessary adjustments.

Once the wheel axle hubs of a single axle have identical camber settings, relative castor settings are determined and adjusted as needed. To accomplish this, the axle is again raised, so that the tripods are no longer in contact with the ground. The tripod is positioned, so that the nonadjustable caster gauge reads zero, indicating that the gauge bar is level, or parallel with the ground. The wheel axle hubs are positioned, using the steering wheel, as if the vehicle was to be driven straight ahead. In the case of the front wheel axle, the steering wheel is turned a set amount, generally 180°, which causes the wheel hub assembly to turn approximately 10°.

Once a wheel hub assembly has been rotated, the adjustable gauge is calibrated to zero, and then the steering wheel is rotated 360° in the opposite direction, so that the wheel hub assembly turns to −10° from the starting position. A second reading is then taken from the adjustable gauge, and compared with the second set of readings taken from the other wheel hub assembly on the same axle, which undergoes the same mirror image steps. This gives a castor reading of the wheel hub assemblies, relative to each other, which allows the castor to be adjusted so that the wheel hub assemblies have matching castor.

The final step in the alignment is to lower the axle so that the tripods are in contact with the ground and slightly support the vehicle's weight. The toe bars are then positioned on each tripod, so that one end of the toe bar is secured to one of the gauge bars, with the other end of the toe bar, bearing the measurement markings, is positioned in the corresponding gauge bar notch. The toe bar measurement markings are read, using the adjacent flange on the gauge bar as a reference point.

When the toe bars are in position, a small gap will exist between the length of the toe bars and the T-bars. Each of the T-bars on a given tripod are parallel to each other. The toe bars must also be parallel to each other, in order to make proper readings using the toe bar measurement markings. Moving the wheel hub assembly and tripod slightly from side to side, so that the gap between the toe bar a T-bar has a uniform width, ensures that each toe bar is aligned with the adjacent T-bar, causing the toe bars to be aligned with each other.

Proper adjustments can be made with regard to the toe and toe out alignment, using the measurements on the toe bar ends. If the measurements on the toe end bars match, the wheel hubs are pointing straight ahead, or indicating parallel paths of tire travel. If a certain amount of toe in is desired, then the distance between the tripods at the point of the toe bar in front of the wheel hub assembly should be less than the distance between the tripods along the toe bar behind the wheel hub assembly. To obtain toe out, the distance between the tripods along the toe bar in front of the wheel hub assembly is greater than the distance between the tripods along the toe bar behind the wheel hub assembly.

DESCRIPTION OF THE DRAWINGS

FIG. 1 is a perspective view of a tripod attached to a wheel hub assembly.

FIG. 2 is a perspective view of an adjustable bubble gauge.

FIG. 4 is a perspective view of a toe bar, with the toe bar protruding pin shown, positioned above the notch area created by the flanges on the gauge bar.

DESCRIPTION OF THE PREFERRED EMBODIMENT

Figure 3:
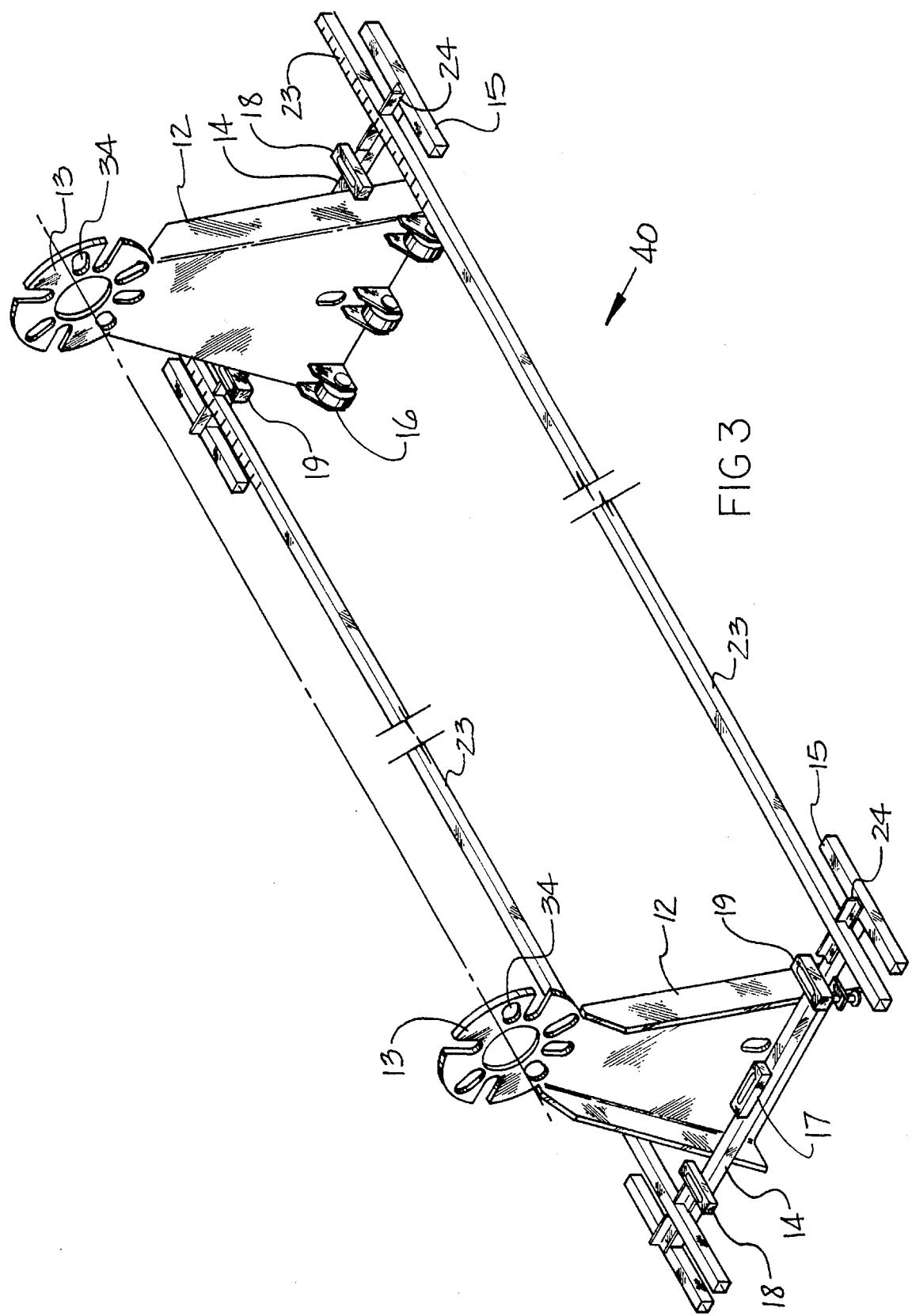
FIG. 3 is a perspective view of the entire wheel alignment apparatus.

Referring to FIG. 1, the outer side of the alignment apparatus 10 and a wheel hub assembly (hub) 11 is shown. The alignment apparatus 10 comprises a tripod 12 that has a base with a circular top area 13, defining a plurality of apertures 34.

Referring also to FIG. 3, the tripod 12 has one or more rollers 16, that support the tripod 12 when it is in a vertical position and on ground level.

A gauge bar 14 is fixed to the tripod 12 above the rollers 16, with the gauge bar 14 ends each having a T-bar 15 fixed perpendicular to the length of the gauge bar 14. A caster gauge 17 is fixed to the gauge bar 14, and indicates the horizontal level of the gauge bar 14 length. A camber gauge 18 is fixed along the length of the gauge bar 14, between the tripod 12 and T-bar 15. The camber gauge 18 indicates the tilt of the gauge bar 14 from side to side.

Referring also to FIG. 2, an adjustable gauge 19 is positioned on the gauge bar 14, and indicates the tilt of the gauge bar 14 from side to side. The adjustable gauge has an adjustment screw 20, that when turned allows the adjustable gauge 19 to be calibrated to zero (indicating level). Each of the three gauges 17, 18, and 19 can be of any type of level indicator gauge, but bubble level gauges are preferred.

To determine the camber, caster and toe in and toe out of each wheel hub 11, relative to another wheel hub 11 on each axle, the vehicle is placed on a level surface, and the axle, having the wheel hubs 11 that are desired to be checked for alignment is raised. The axle is raised by any conventional means, such as a simple floor jack, as long as the tires and wheels may be removed, and replaced by the tripod 12.

Once the wheels are removed, the tripod 12 is fitted against the hub 11, by positioning the wheel studs 21 through the spaced apertures 34, and tightening the nuts 22 on the studs 21, so that the tripod is firmly fixed to the hub 11. The tripod 12 is designed to support the vehicle in place of the wheel, and is constructed of materials that are able to withstand the downward force applied by the weight of the vehicle. The apertures 34 are positioned on the tripod so as to accommodate common wheel stud 21 placement patterns and sizes. The circular top area 13 of the tripod 12, may be sized accordingly, to allow fitting to different sized hubs 11. Larger trucks, for example, may require more or larger apertures 34 for additional studs 21. Typically, one of three differently sized tripods 12 and circular top areas 13 are able to be fitted to the majority of hubs 11 used on vehicles currently on the market. Each tripod 12, regardless of the size, or intended vehicle use, is able to be used with the rest of the alignment apparatus parts.

Once the tripod 12 is fixed to the hub 11, the vehicle is lowered, until the rollers 16 contact the ground, and support the vehicle weight. During this lowering, the hubs 11 will change camber position, as the weight of the vehicle presses down on them. The rollers 16 allow the tripod 12 to be moved from side to side as the weight of the vehicle bears down on the tripod 12, to give the camber angle of the wheels, while under operating load. The rollers 16 allow a more accurate camber reading than that ascertained while the wheels are on the vehicle, since wheels allowed remain on the hub 11, during the lowering of the vehicle, prevents the hub 11 from moving to an accurate camber position due to the friction of the tire against the ground surface, once they contact each other.

Once the vehicle has been fully lowered, so that the hubs 11 are supported by the tripods 12, a reading is taken from the camber gauge 18, to determine whether or not the camber needs to be adjusted to fit within required parameters of camber set by the manufacturer of the vehicle. If camber adjustments are necessary, the hub 11 and tripod 12 are raised so that the rollers 16 are no longer in contact with the ground. As the axle and tripod 12 are raised, the downward force applied to the hub 11 is removed, which causes the hub 11 to shift to a different camber position, which is the camber position of the hub 11 while not under load.

The adjustable gauge 19 is calibrated, to the same setting as was shown by the camber gauge 18, when the tripod 12 supported vehicle on ground level. Adjustments are manually made to the camber settings of the hub 11, until the reading of the calibrated adjustable gauge 19 is within the desired setting parameters. This is done to each hub 11 on the axle.

Once the hubs 11 on a given axle have identical camber settings, relative castor settings are determined, and each hub 11 is adjusted as needed, so that the castor settings of each hub 11 matches the other hub 11 on a given axle. The axle is raised or lowered, until the tripod 12 is just above ground level, so the rollers 16 no longer contact the ground. As one end of the vehicle is raised, the vertical angle of the tripod 12 also changes, and must be corrected so that the tripod 12 is vertical. This is done manually, by rotating the tripod 12 around the hub, while the particular axle of the vehicle is raised, until the centrally located caster gauge 17, reads level. This indicates that the tripod 12 and gauge bar 14 are level or horizontal.

The caster of each hub 11 is checked relative to the caster of the hub 11 on the opposite end of the axle. The hubs 11 and tripods 12 are positioned, using the steering wheel (not shown), as if the vehicle was to be driven straight ahead.

When checking relative caster for a front wheel axle, the steering wheel is turned a set amount of degrees, as desired by the mechanic. The movement of steering wheel turning is preferably 180°, since that is an easily identified movement, and such a movement turns the hub 11 approximately 10° around a vertical axis, which is the extent of turn necessary to make an accurate caster reading.

Once the hub 11 has been turned, the adjustable gauge 19 is calibrated to zero, or set to level, and the steering wheel is turned so that the hub 11 turns the same amount of degrees in the opposite direction. If the steering wheel were turned 180° initially, the mechanic would turn the steering wheel in the opposite direction 360°, so that the hub would turn approximately 10° in the opposite direction from the initial straight ahead starting position. A second reading is taken from the adjustable gauge 19, and the same steps are followed with the other hub 11.

The second readings from each adjustable gauge 19 are compared relative to each oilier, and one of the hubs 11 are adjusted so that the difference in readings on the adjustable gauge 19, following the turning of the steering wheel, are identical for each hub 11.

The third and final adjustment is to set the toe in or toe out of the hub 11, relative to the corresponding hub 11 on the other end of the axle. Following the camber and caster adjustments, the axle is lowered until the tripods 12 are in contact with the ground. Each tripod 12 and hub 11 are positioned, so that the wheel, if it were on the hub, 11, would be pointing straight ahead. This is done to the hub 11 on both ends of the axle.

Identical toe bars 23, that have a length in excess of the axle, are positioned between the tripods 12 on each hub 11 and whose ends are supported by a gauge bar 14. The toe bars 23 may also have measurement markings on one end, and a downward protruding pin 25 on the other end. They are placed on the gauge rods 14 of each tripod 12, between a notch defined by a flanges 24. The protruding pin 25 fits into a hole in the notch area, preventing the toe bar 23 from moving horizontally. The measurement markings on the toe bar 23 are adjacent to the flanges 24, which are used as points of reference for reading the measurement markings.

When the toe bars 23 are in position on the gauge rods 14, a small gap will exist between the toe bars 23 and the T-bars 15. The tripods 12, while fixed to the hub 11, can be verified as parallel, by visually determining that the gap between the tow bars 23 and the T-bars 15 has a uniform width along its length. If the gap does not exhibit a uniform width, one of the tripods 12 can be turned slightly from side to side, until the gap between the toe bar 23 and T-bar 15 is uniform for each hub 11. This ensures that the hubs 11 are aligned with each other, and that the toe bars 23 are also aligned with each other.

Once the toe bars 23 are determined to be parallel, proper adjustments can be made with regard to the toe in and toe out alignment, using the measurement markings on the toe bar 23. After brief experience with the use of this apparatus, a mechanic can check the toe in or toe out of the hubs 11, without having to first set the hubs 11 to a parallel setting. The hubs 11 are pointing straight ahead, or indicating parallel paths of travel, if the measurement markings, in relation to the flanges 24, on both toe bars 23 are alike. If the measurement on the toe bar 23 forward of the hub 11 indicates less distance between the tripods 12, than the distance shown by the toe bar 23 rearward of the hub 11, then the wheels are set so that they toe in. The wheels are set so that they toe out when the distance between the tripods along the toe bar 23 in front of the hub 11 is greater than the distance between the tripods 12 shown by the toe bar 23 rearward of the wheel hub assembly.

From the foregoing statements, summary and description in accordance with the present invention, it is understood that the same are not limited thereto, but are susceptible to various changes and modifications as known to those skilled in the art and we therefore do not wish to be limited to the details shown and described herein, but intend to cover all such changes and modifications which would be encompassed by the scope of the appended claims.

I claim:

1. An alignment apparatus comprising:
   (a) two tripods that are able to replace the hubs and wheels of a particular axle on a vehicle, in which each said tripod has a top area that defines a plurality of spaced apertures, where said apertures are able to receive studs, so that when nuts are tightened on the studs, against the tripod, the tripod is fixed to a hub;
   (b) one or more rollers that are fixed to the tripod;
   (c) a gauge bar that is fixed to each tripod;
   (d) a caster gauge that is fixed to the gauge bar, in which said gauge displays whether the gauge bar length is horizontal;
   (e) a camber gauge that is fixed to the gauge bar, in which said gauge displays the tilt of the gauge bar from side to side;
   (f) an adjustable gauge that is fixed to the gauge bar, in which said gauge displays the tilt of the gauge bar from side to side, and which can be calibrated to a zero or level setting;
   (g) two toe bars that are positioned between the tripods, forward and rearward of the hub, where the ends of said toe bars are supported by the gauge bar on each tripod.

2. An alignment apparatus as recited in claim 1, in which the adjustable gauge is calibrated using a screw, that when said screw is turned, it raises or lowers one end of the gauge.

3. An alignment apparatus as recited in claim 1, in which each toe bar has a protruding pin on the underside of one of the ends, in which said pin fits within an aperture on the gauge bar, to hold the toe bar in position.

4. An alignment apparatus, as recited in claim 1, in which the toe bars have measurement markings on at least one of their ends.

5. An alignment apparatus, as recited in claim 1, in which the caster gauge, camber gauge, and adjustable gauge are bubble gauges.

\* \* \* \* \*